United States Patent [19]

Moss et al.

[11] Patent Number: 4,521,869

[45] Date of Patent: Jun. 4, 1985

[54] PROGRAM TIMER CONTROL

[75] Inventors: William H. Moss, Willoughby; Thomas J. Scheib, Chesterland, both of Ohio

[73] Assignee: The Babcock & Wilcox Company, New Orleans, La.

[21] Appl. No.: 364,822

[22] Filed: Apr. 2, 1982

[51] Int. Cl.[3] .............................................. G06F 15/46

[52] U.S. Cl. ..................................... 364/900; 364/145

[58] Field of Search ... 364/200 MS File, 900 MS File, 364/135, 145

[56] References Cited

U.S. PATENT DOCUMENTS

| | | | |
|---|---|---|---|
| 3,903,515 | 9/1975 | Haydon et al. | 364/145 X |
| 4,200,910 | 4/1980 | Hall | 364/145 |
| 4,213,182 | 7/1980 | Eichelberger et al. | 364/145 |
| 4,279,012 | 7/1981 | Beckedorff et al. | 364/145 |

*Primary Examiner*—Thomas M. Heckler
*Attorney, Agent, or Firm*—Vytas R. Matas; Robert J. Edwards

[57] ABSTRACT

A program timer control is disclosed for applying one of at least two functions to a parameter controller which is varied over the course of a full day. A day counter counts the passage of days and operates a switch to control the parameter controller according to the non-working day function when a weekend day occurs. A manually operable setting element is also provided when the following day is a holiday to select the non-working day function. All other days are assumed to be working days so that the switch is operated to apply the working day function to the parameter controller.

6 Claims, 8 Drawing Figures

FIG. 5
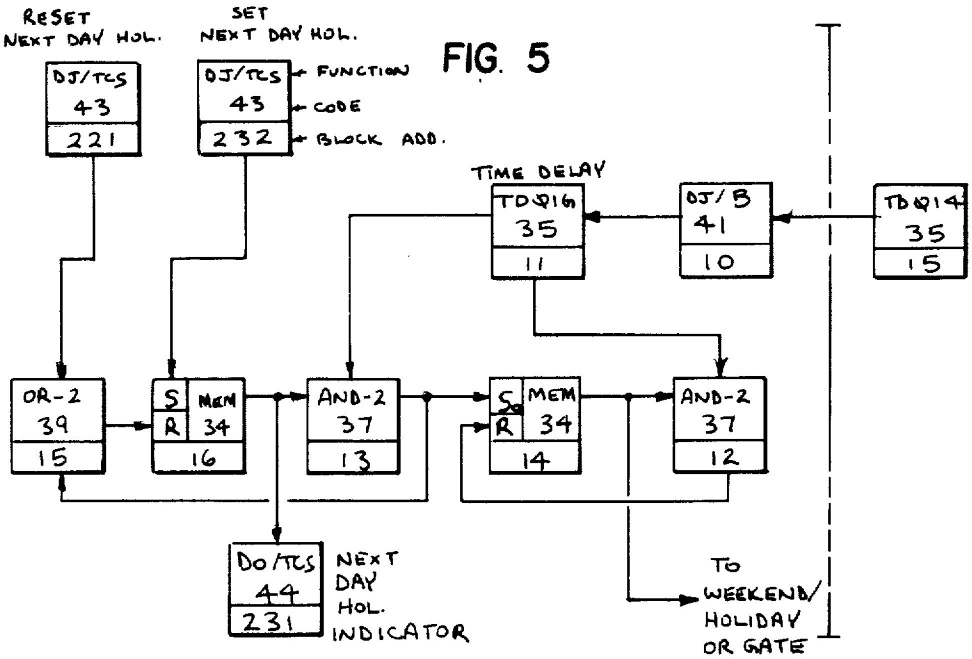
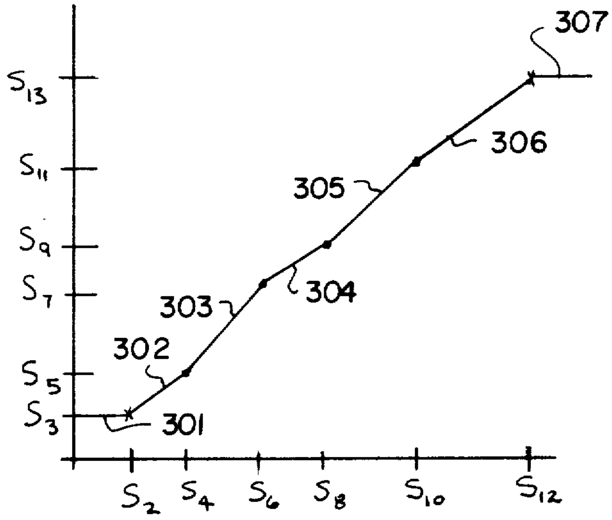
FIG. 6

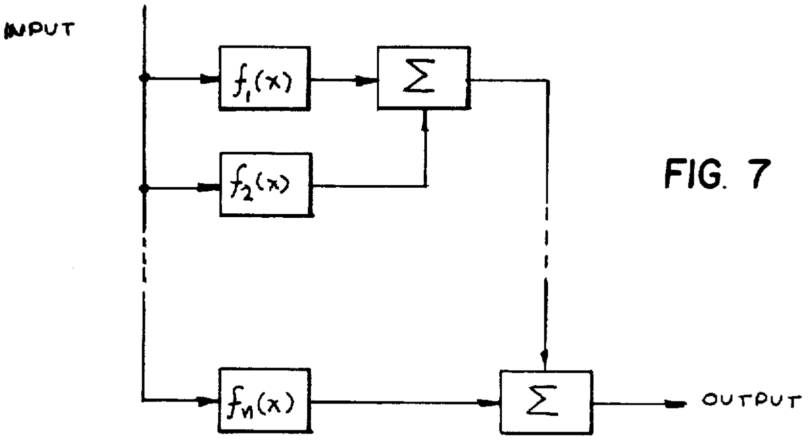
FIG. 7
FIG. 8
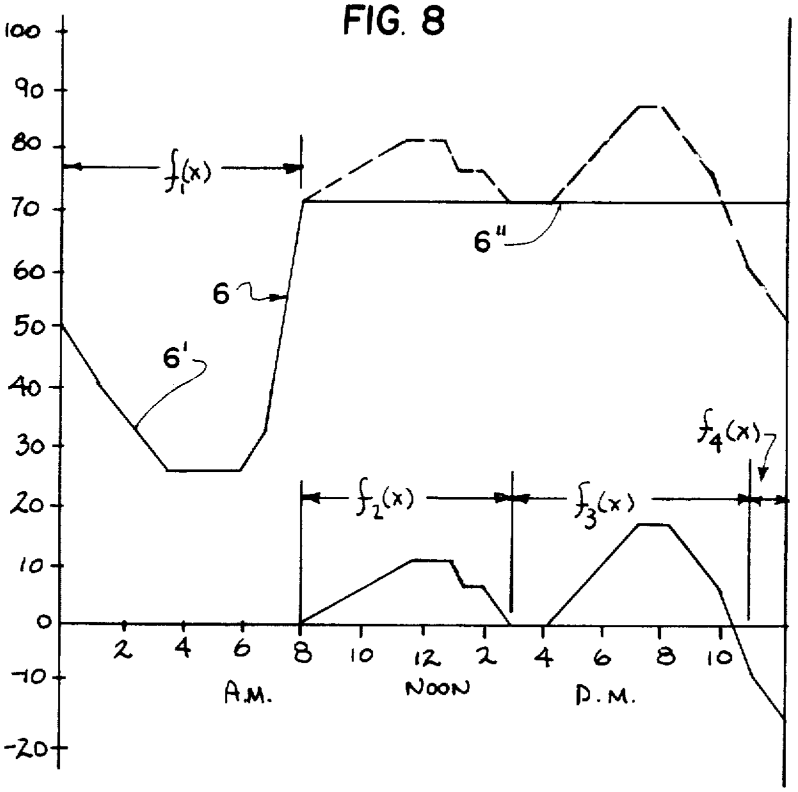

PROGRAM TIMER CONTROL

FIELD AND BACKGROUND OF THE INVENTION

The present invention relates in general to program logic controls abbreviated PLC's, and in particular to a new and useful PLC which discriminates between working and non-working days whether the non-working days are holidays or weekends.

There are many control applications that require supervisory set point control that is a function of time-of-day only. Some examples include the generation of temperature set points for building heating, ventilating and air conditioning control, the operation of mechanical equipment, such as water pumping, during off-peak hours to take advantage of reduced utility rates during non-peak demand, and generation of feed forward chemical demand in waste water treatment operations where diurnal or daylong variations are known but key process variables are difficult or expensive to measure (e.g. coagulant demand and chlorine demand for waste water treatment).

Typical diurnal variations for building temperature settings and waste water treatment coagulant demand are shown in FIGS. 1 and 2. These control applications require set point or control output variation on an hourly basis and differentiation among working days, weekends and holidays.

Programmable Logic Controllers have been used in applications requiring timing, sequence, logic, counting and arithmetic to control machines and processes. The PLC is well suited for handling sequential control ahd counting. Configurations of PLC's to handle function generators, analog output signals, and precision time integration on the time scale of days to weeks is very complex, however.

For example, Allen Bradley Bulletin 1774 discusses an arithmetic module (Cat. No. 1774-102) which provides four function arithmetic capabilities (+,−,× and ÷) of three digit decimal numbers (3 digits for + and −) (6 digit resultant for × and ÷). The capabilities of the Bradley function generators and precision time integrators, on a time scale of days to weeks, is not available.

Modicon 584 also provides basic arithmetic operations (+,−,× and ÷) with integer arithmetic. The division operation maintains whole number and decimal fraction. A move instruction is provided which could crudely perform an analog transfer or function generator operation.

SUMMARY OF THE INVENTION

According to the invention, a program timer control is disclosed which utilizes sequential logic, analog control manipulation and a precise long term time integration on the order of days, in a single module.

All three requirements can be provided by known control equipment.

Complex function generators are provided for bumpless analog transfer and precise real time integration on a time scale of days.

According to the invention, a selection can be made between working and non-working days even where the non-working days are holidays occurring during normally working days, and weekends. According to another feature of the invention such controls can be established up to three days in advance.

The function generators may be cascaded to provide precise piecewise linear approximations of complex diurnal functions.

Accordingly an object of the invention is to provide a program timer control device and method for controlling the operation of a parameter controller comprising, a real time integrator for generating a time signal corresponding to a time of day during at least one twenty four hour period, pulse means connected to the integrator for generating a day pulse each time one full day passes, first and second function generators for producing workday and non-workday functions according to which the parameter controller is controlled, a selection switch connected between the function generators and the parameter controller for selecting one of the function generators, a day counter connected to the pulse means for counting the passage of days and generating a weekend signal upon the occurrence of a weekend day, manually operable setting means for generating a holiday occurrence signal, and a logic circuit connected to the switch, the pulse means, the setting means and the day counter for controlling the switch to apply the non-working day function to the parameter controller upon receiving a holiday occurrence signal or a weekend signal.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which preferred embodiments of the invention are illustrated.

BRIEF DESCRIPTION OF THE DRAWINGS

In the Drawings:

FIG. 5 is a block diagram showing an embodiment of the invention using the NETWORK 90 CONTROLLER;

FIG. 6 is a graph illustrating a manner of combining a plurality of functions to achieve an overall control operation.

FIG. 7 is a schematic representation showing how the plurality of functions are combined; and FIG. 8 is a graph showing how a plurality of functions can be combined to control an alum metering pump of a waste water plant.

DESCRIPTION OF THE PREFERRED EMBODIMENTS

Figure 1:
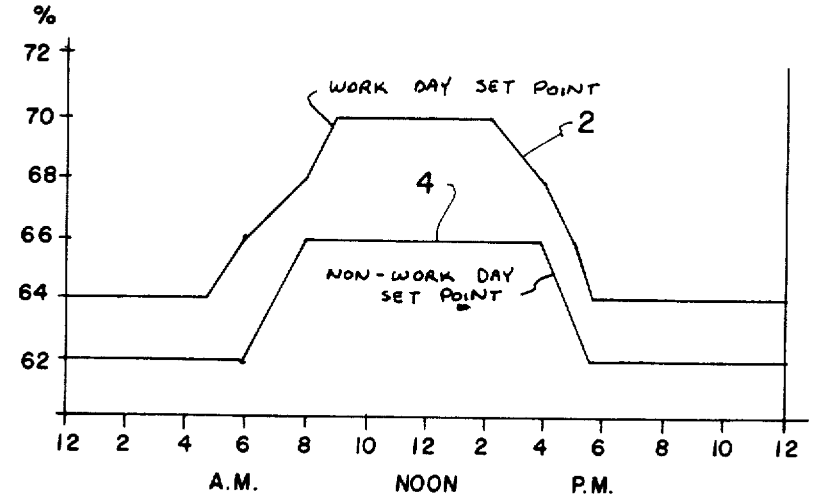
FIG. 1 is a graph showing a function required for setting a thermostat control on working and non-working days.

Referring to the drawings in particular, the invention embodied therein comprises a method and apparatus for controlling diurnal variations in equipment that operate at varied levels over a period of days, which takes into account the occurrence of a working or non-working day, whether it be a weekend or holiday.

FIG. 1 shows two functions at curves 2 and 4, which control a thermostat setting operation for working days and non-working days respectively.

Figure 2:
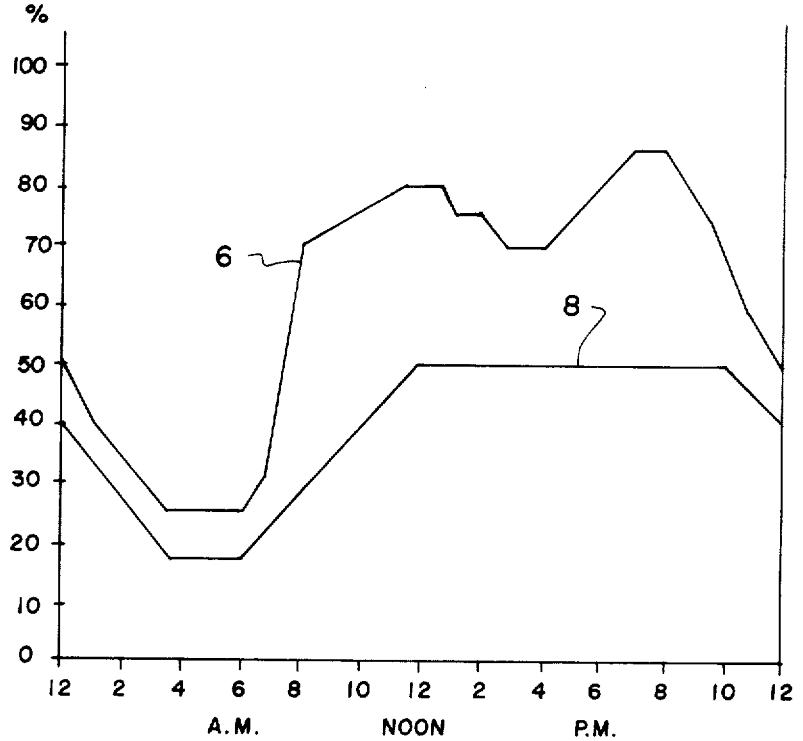
FIG. 2 is a graph showing the controls of of an alum metering pump for waste water treatment according to two functions, one for workdays and one for non-workdays.

In FIG. 2, the control of an alum metering pump in percent of total flow capacity is shown plotted against a one day period of time. Two functions, shown at 6 and 8 show the operation of the pump for workdays and non-workdays respectively. The control of such a metering pump is useful in municipal waste water treatment plants.

According to the invention, the control operation can be achieved utilizing a NETWORK 90 device. Network 90 is a trademark of the Bailey Meter Division of the Babcock & Wilcox Company.

Figure 3:
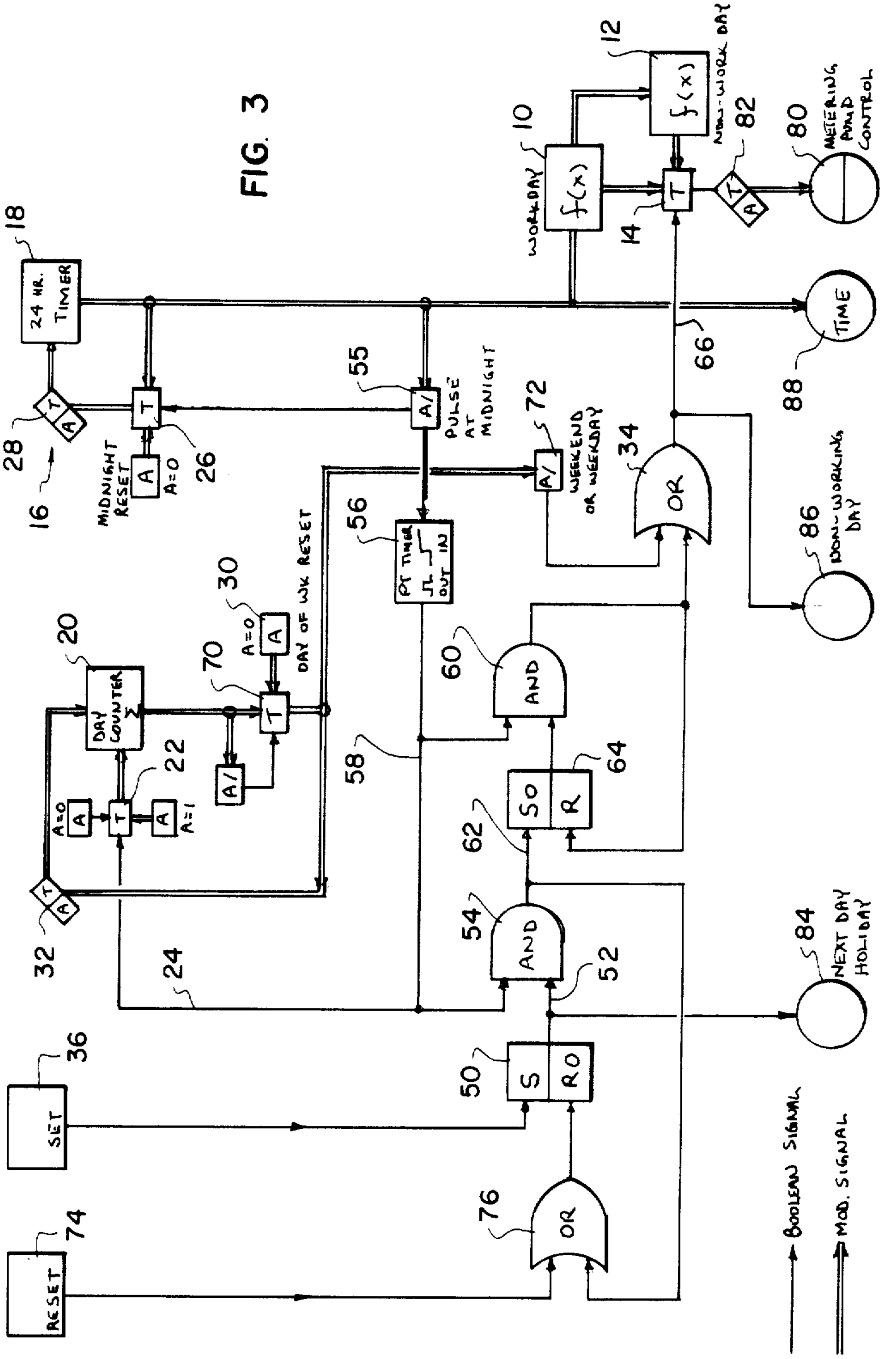
FIG. 3 is a schematic block diagram of one embodiment of the invention for applying the workday or non-workday function of FIGS. 1 or 2, to suitable control equipment.

Program timer control methodology using Bailey's microprocessor based NETWORK 90 control instrumentation is shown in FIG. 3. The system comprises two function generators 10, 12 one each for working days and non-working days. A transfer switch 14 and associated logic, selects the appropriate function generator. The program timer 16 control system includes a 24-hour clock 18, a day-of-the-week counter 20, and a memory logic system to preset the logic for a next day holiday situation.

The timer uses the integrator in the Bailey Controller Module PID algorithm to maintain correct time of day. The timer can be set manually through a standard manual/auto station 28, and it is reset automatically every 24 hours over switch 26.

The day-of-the-week counter 20 is advanced each day at midnight over line 24 and switch 22. The day counter is reset every week over automatic unit 30 or manual unit 32, and is checked to determine whether the days are working days or weekends. An OR gate 34 checks to determine if a working day is a holiday.

Figure 4:
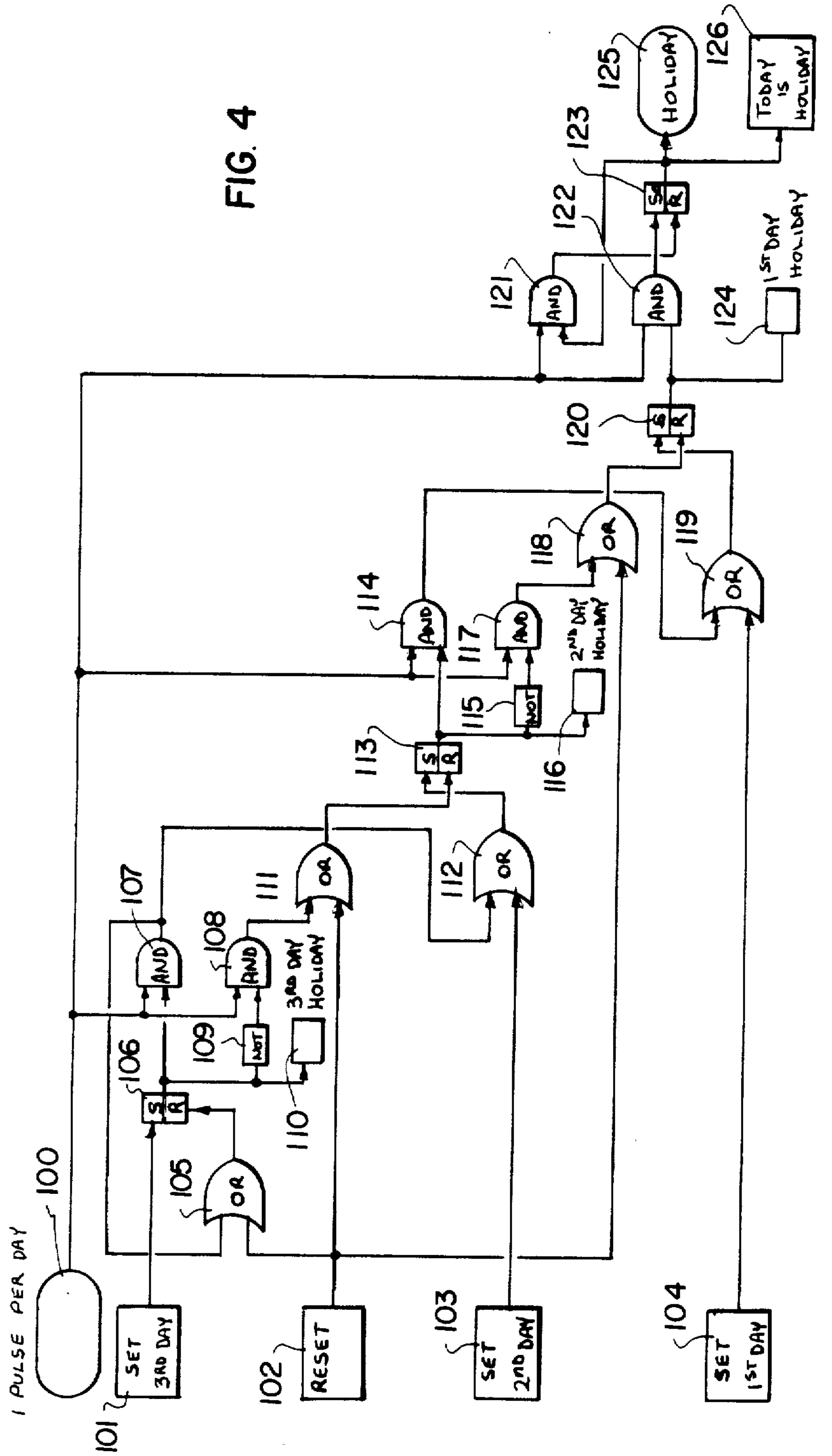
FIG. 4 is a schematic block diagram of another embodiment of the invention useful for setting work or non-workday days up to three days in advance.

The next-day-holiday check allows operator's to set the program timer the day prior to a holiday using a set operator 36. The logic shown in FIG. 3 provides for the next-day-holiday only. This logic can be expanded to allow for next-day-holiday checks up to 3 days in the future, as shown in FIG. 4, to allow setting the program timer control for holiday weekends.

In FIG. 3, single solid lines indicate boolean symbols (logical 1 or logical 0) and double solid lines indicate analog or modulated signals.

In operation, when the following day is a holiday, as already noted an operator activates set unit 36 which applies a logical 1 signal to the RS flip-flop 50. The flip-flop 50 thus outputs a logical 1 signal over line 52 which is inputted into first and gate 54. At midnight, the beginning of the following day as measured by twenty-four hour timer 18 and applied to an element 54, element 54 applies a logical one signal to PT timer 56 which supplies a positive pulse over line 58 to the first AND gate 54 and also a second AND gate 60. This applies a one signal to OR gate 34 which produces a logical one on line 66. This controls switch 14 to select non-workday function generator 12 which may correspond for example to curve 4 or 8 of FIGS. 1 and 2 respectively.

In the same manner, when day counter 20 senses the approach of a weekend day, it applies an appropriate signal to switch 70 which in turn controls element 72 to apply a logical 1 to the other input of OR gate 34 and also produce the proper selection of the non-workday function generator 12 by switch 14.

On all other workdays, which are all workdays, a reset element 74 which can be manually operated applies a one signal over OR gate 76 to flip-flop 50 which produces a zero signal on line 52. A one pulse on line 58 will thus still not be operable to produce a one pulse on line 62 so that OR gate 60 as controlled by flip-flop 64 will produce a logical zero output. Since also a zero output will be supplied by element 72 (since it is not a weekend) the line 66 will receive a logical zero signal and the control switch 14 will select the workday function generator 10.

In this way either of the functions 10 or 12 will be applied to the metering pump control or thermostat control labelled 80. This control can also be manipulated in known fashion by a manual manipulator 82.

An indicator 84 is provided for indicating that the next day is a holiday which taps its signal from line 52. A non-workday indicator 86 is also provided which taps its signal from line 66 and a time indicator 88 is provided for reading the time as received from the timer 18.

In FIG. 4 similar logic elements including AND gates, OR gates and set/reset flip-flop are used to set a holiday or non-workday three days in advance.

The operator of the system sets the future holiday as the 3rd day in block 101, the second day in block 103, or the first day in block 104. A pulse generated once per day from block 100 advances memory functions in blocks 113, 120 and 123. The third day memory in block 106 is reset by the output of OR gate 105, which is initiated by an external reset in block 102 or by the output from AND gate 107 which requires that the once per day pulse from block 100 is set one day after the third day memory in block 106 is set. The output from this same AND gate in block 107 sets the second day memory in block 113. The memory blocks shift in sequence once per day by similar logic. The reset for the second day logic memory in block 113 is controlled by the external reset in block 102 through the OR-gate 111. It is also controlled by the once per day pulse timer in block 100 provided that the third day memory is inactive. The test for this is the NOT block 109, which prevents a reset of block 113 if the day memory in block 106 is set. Similar logic elements are used to advance the second day and first day memory blocks.

Indicator stations in blocks 110, 116 and 124 are used to denote which days have been set for holidays.

As noted, the program timer control uses the outputs from separate function generators for either working or non-working days. The NETWORK 90 Function Generator Block computes an output which is related to the input by a piecewise linear function (see FIG. 6). Six input/output pairs define five linear segments 302 to 306. The upper and lower bounds 301 and 307 are clamped so that function generator blocks may be combined additively (see FIG. 7) to handle more complex functional relationships. The daytime diurnal variation for the alum metering pump control (see FIG. 2) is an example of a more complex functional relationship. The use of multiple NETWORK 90 Funcrion Generator Blocks for the alum metering pump control is illustrated in FIG. 8.

In FIG. 8 the total function (curve 6) is divided into curve 6' (before 9 A.M.) and 6" (after 9 A.M.):

$$f_{total}(x)=f_1(x)+f_2(x)+f_3(x)+f_4(x)$$

where $f_1(x)$ is curve 6' and the other functions combined are curve 6''. Since all but $f_1(x)$ are at 70% flow or more, for x=9 we have:

$$f_{total}(9)=f_1(9)+f_2(9)+f_3(9)+f_4(9)=70+0+0+0=70.$$

or:
for x=23.5 we have:

$$f_{total}(23.5)=70+0+(-10)+(-5)=55.$$

Microprocessor based NETWORK 90 Control Instrumentation can be used for control, data logging, reporting and calculation. FIG. 3 illustrates NETWORK 90 application to program Timer Control and includes system partitioning into NETWORK 90 Controller Modules.

While specific embodiments of the invention have been shown and described in detail to illustrate the application of the principles of the invention, it will be understood that the invention may be embodied otherwise without departing from such principles.

What is claimed is:

1. A program timer control for controlling the variation of a parameter in an operating system comprising:
- a real time integrator for generating a time signal corresponding to the time of day during at least one twenty four hour period;
- pulse means connected to said integrator for generating a day pulse upon the passage of each full day;
- a controllable parameter controller for varying the parameter of the operating system;
- a first function generator for controlling the parameter controller according to a first function corresponding to a working day;
- a second function generator for controlling the parameter controller according to a second function corresponding to a non-working day;
- a controllable selection switch connected to said function generators and said parameter controller for applying one of said first and second functions to said parameter controller;
- a day counter connected to said pulse means for counting the passage of days and for generating a weekend signal upon the occurrence of a weekend day;
- a manually operable setting means operable when a following day is a holiday to generate a holiday occurrence signal; and
- a logic circuit connected to said setting means, said day counter, said pulse means and said selection switch for operating said selection switch to apply said second function corresponding to a non-working day to said parameter controller upon one of the occurrences of a weekend signal and a day pulse signal which occurs immediately after said logic curcuit has received a holiday occurrence signal, said logic circuit controlling said switch to apply said first function corresponding to a working day to said parameter controller at all other times.

2. A program timer according to claim 1, including manually operable resetting means connected to said logic circuit for generating a resetting signal in said logic circuit for said logic circuit to operate said switch to select said first function.

3. A program timer according to claim 2, wherein said logic circuit comprises a first OR gate having a first input connected to said resetting means and a second input, a first flip-flop having a first input connected to said setting means and a second input connected to an output of said first OR gate, a first AND gate having a first input connected to an output of said first flip-flop and a second input connected to said pulse means, a second flip-flop having a first input connected to said first AND date and a second input, a second AND gate having a first input connected to an output of said second flip-flop and a second input connected to said pulse means, a second OR gate having a first input connected to an output of said second AND gate and a second input connected to said day counter for receiving said weekend signal, said second OR gate having an output connected to said switch, the output of said first AND gate connected to the other input of said first OR gate and the output of said second AND gate connected to the other input of said second flip-flop.

4. A program timer according to claim 3, including day of the week reset means connected to said day counter for resetting said day counter to begin the counting of days from the beginning of a week and midnight reset means connected to said integrator for resetting said integrator to start time integration from the beginning of a day.

5. A program timer control according to claim 4, including a next day holiday indicator connected to the output of said first flip-flop, a non-working day indicator connected to the output of said second OR gate and a time of day indicator connected to said time integrator.

6. A program timer control according to claim 1, wherein said logic circuit includes means for counting up to three days in advance of a holiday occurrence signal for controlling said switch to apply said second function to said parameter controller up to three days after the occurrence of a holiday occurrence signal.

* * * * *